July 17, 1928.

R. J. GREENE

METHOD OF MAKING ANTIQUE SURFACES

Filed March 21, 1927

1,677,716

Inventor
Raymond J. Greene
By Freast and Boud
Attorneys

Patented July 17, 1928.

1,677,716

UNITED STATES PATENT OFFICE.

RAYMOND J. GREENE, OF SEBRING, OHIO, ASSIGNOR TO THE GEM CLAY FORMING COMPANY, OF SEBRING, OHIO, A CORPORATION OF OHIO.

METHOD OF MAKING ANTIQUE SURFACES.

Application filed March 21, 1927. Serial No. 176,972.

This invention relates to ornamenting surfaces of clay and the like, and more particularly to a novel method of ornamenting the surfaces of back walls and other parts of radiant gas heaters to produce an antique appearance.

The object of the improvement is to provide an ornamental surface for clay and the like in which oxides are applied to the surface and when burned eat into the surface of the clay, giving an antique appearance to the article thus ornamented.

Figure 1:
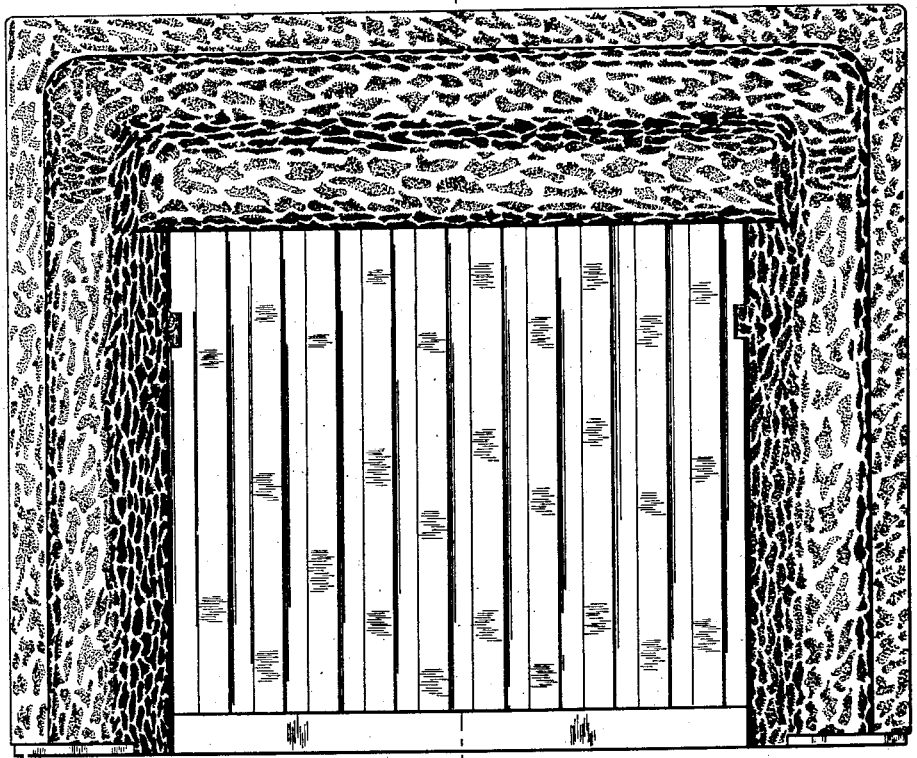
Figure 2:
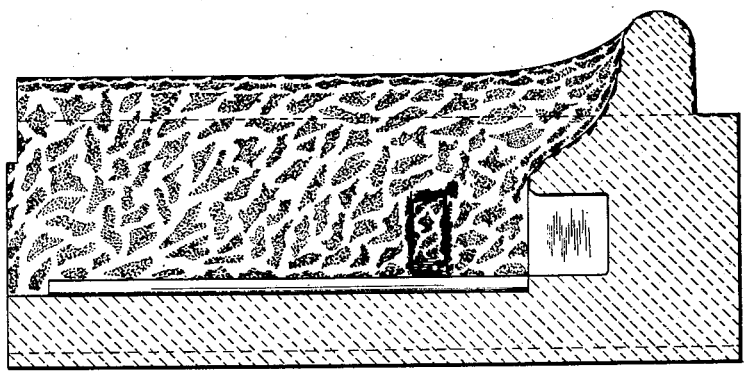

An embodiment of the invention is illustrated in the accompanying drawing, in which Figure 1 is a front elevation of a back wall for a radiant gas heater showing the surface thereof ornamented by the improved method, and Fig. 2, a section taken substantially on the line 2—2, of Fig. 1.

Similar numerals refer to similar parts throughout the drawing.

In carrying out the invention to ornament the surface of a back wall for a radiant, as shown generally at 1, the back wall is molded or formed to the general outline desired, being composed of a mixture of fire clay and magnesium silicate, talc or the like.

A slip, of about the consistency of ordinary paint, containing an oxide such as antimony, cryolite, boric acid or other material which will eat into the magnesium silicate or talc when fired, is then applied to the surface to be ornamented with a sponge or brush.

This slip may be applied in irregular patches of any desired design to produce the necessary appearance and when the back wall is fired the oxide in the slip combined with the magnesium silicate or talc in the fire clay will eat into the surface, giving an antique appearance as indicated in the drawing.

If it is desired to color the portions of the surface which are not attacked by this oxide, a slip of paint containing a chrome oxide may also be applied to the surface. This chrome oxide will not eat into the surface but will merely color the same when fired.

While the invention is described and illustrated as applied to the back walls of radiant gas heaters, it should be understood that this ornamentation is applicable to the radiants themselves or to any other surface of clay or the like.

Although one design of ornamentation is illustrated in the drawing, it will be seen that the oxide slip may be applied in any number of different designs to produce the desired effect when the article is fired.

I claim:

1. The ornamenting process which consists in forming an article of clay mixed with magnesium silicate and the like, applying a slip containing an oxide to the surface of the article, and firing the article whereby the oxide combines with the magnesium silicate to eat into the surface of the clay article.

2. The ornamenting process which consists in forming an article of clay mixed with magnesium silicate and the like, applying a slip containing an oxide of antimony and the like to the surface of the article, and firing the article whereby the antimony oxide combines with the magnesium silicate to eat into the surface of the clay article.

3. The ornamenting process which consists in forming an article of clay mixed with magnesium silicate and the like, applying a slip containing an oxide of antimony and the like to the surface of the article, applying a slip containing chrome oxide to the surface, and firing the article whereby the antimony oxide combines with the magnesium silicate to eat into the surface of the clay article and the chrome oxide colors the uneaten portion of the clay article.

In testimony that I claim the above, I have hereunto subscribed my name.

RAYMOND J. GREENE.